United States Patent
Lakshmanan et al.

(10) Patent No.: US 10,041,141 B2
(45) Date of Patent: Aug. 7, 2018

(54) PROCESS FOR THE SEPARATION OF IRON IN EXTRACTION OF TITANIUM IN MIXED CHLORIDE MEDIA

(71) Applicant: Process Research Ortech Inc., Mississauga (CA)

(72) Inventors: Vaikuntam I Lakshmanan, Mississauga (CA); Ramamritham Sridhar, Oakville (CA); Dipak Patel, Brampton (CA)

(73) Assignee: Process Research Ortech Inc., Mississauga, Ontario (CA)

( * ) Notice: Subject to any disclaimer, the term of this patent is extended or adjusted under 35 U.S.C. 154(b) by 432 days.

(21) Appl. No.: 14/649,904

(22) PCT Filed: Nov. 29, 2013

(86) PCT No.: PCT/CA2013/000996
§ 371 (c)(1),
(2) Date: Jun. 4, 2015

(87) PCT Pub. No.: WO2014/085903
PCT Pub. Date: Jun. 12, 2014

(65) Prior Publication Data
US 2015/0315677 A1    Nov. 5, 2015

Related U.S. Application Data

(60) Provisional application No. 61/733,033, filed on Dec. 4, 2012.

(51) Int. Cl.
| | |
|---|---|
| C22B 3/00 | (2006.01) |
| C22B 3/26 | (2006.01) |
| C22B 3/44 | (2006.01) |
| C22B 3/10 | (2006.01) |
| C22B 34/12 | (2006.01) |

(52) U.S. Cl.
CPC .............. *C22B 3/0005* (2013.01); *C22B 3/10* (2013.01); *C22B 3/44* (2013.01); *C22B 34/1245* (2013.01); *Y02P 10/234* (2015.11)

(58) Field of Classification Search
CPC ......... C22B 34/1245; C22B 3/44; C22B 3/10; C22B 3/0021; C22B 3/00; Y02P 10/234
USPC ..................................................... 423/82, 139
See application file for complete search history.

(56) References Cited

U.S. PATENT DOCUMENTS

| | | | |
|---|---|---|---|
| 3,104,950 | A | 9/1963 | Ellis |
| 3,622,269 | A | 11/1971 | Tomochika et al. |
| 3,795,727 | A | 3/1974 | Yamamura et al. |
| 3,922,164 | A | 11/1975 | Forrest et al. |
| 6,375,923 | B1 | 4/2002 | Duyvesteyn et al. |
| 6,500,396 | B1 | 12/2002 | Lakshmanan et al. |
| 6,699,446 | B2 | 3/2004 | Lakshmanan et al. |
| 7,803,336 | B2 | 9/2010 | Lakshmanan et al. |
| 8,916,116 | B2 | 12/2014 | Lakshmanan et al. |
| 2013/0149219 | A1 | 6/2013 | Lakshmanan et al. |

FOREIGN PATENT DOCUMENTS

| | | |
|---|---|---|
| CN | 102191387 A | 9/2011 |
| EP | 0298763 A2 | 1/1989 |

OTHER PUBLICATIONS

PCT/CA2013/000996 International Search Report and Written Opinion dated Feb. 13, 2014.

*Primary Examiner* — Steven J Bos
(74) *Attorney, Agent, or Firm* — Hamilton IP Law, PC; Jay R. Hamilton; Charles Damschen

(57) ABSTRACT

A process for leaching a value metal from a titaniferous ore material comprising the step of leaching the ore material at atmospheric pressure with a lixiviant comprising magnesium chloride and hydrochloric acid is disclosed. Iron and titanium are leached into solution. Iron in the ferric state may be separated from titanium in solution using extraction with alkyl ketone. More effective separation of titanium with lower contamination with iron is obtained.

22 Claims, 8 Drawing Sheets

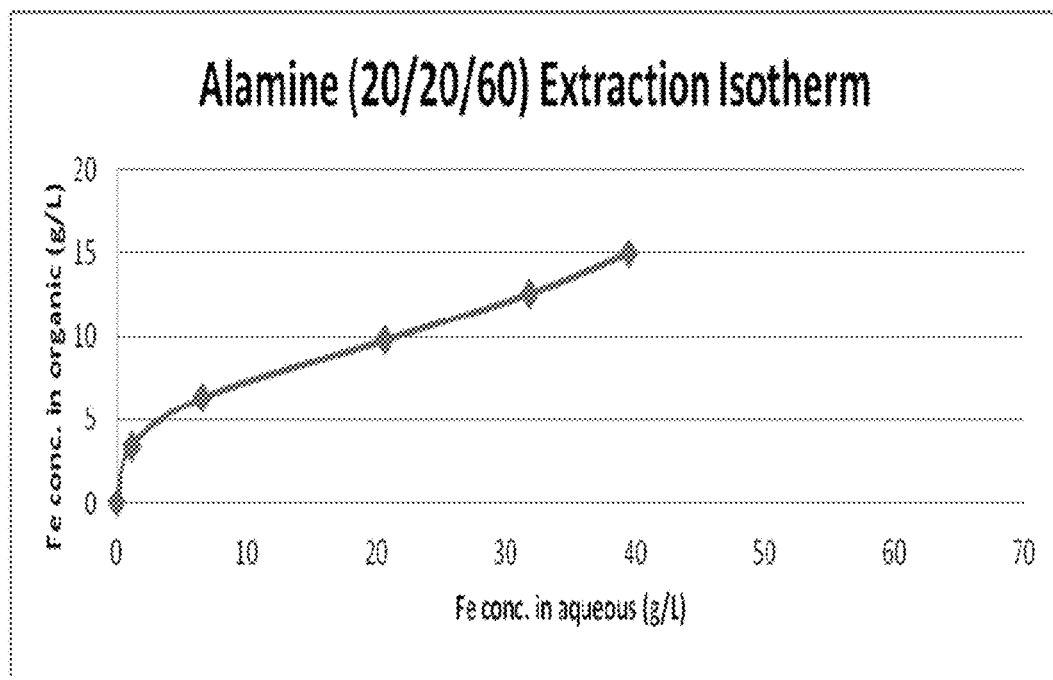
FIG. 1 Alamine (20/20/60) Extraction Isotherm
(Composition of raffinate - <1 ppm Fe, 12- 13 g/L Ti)

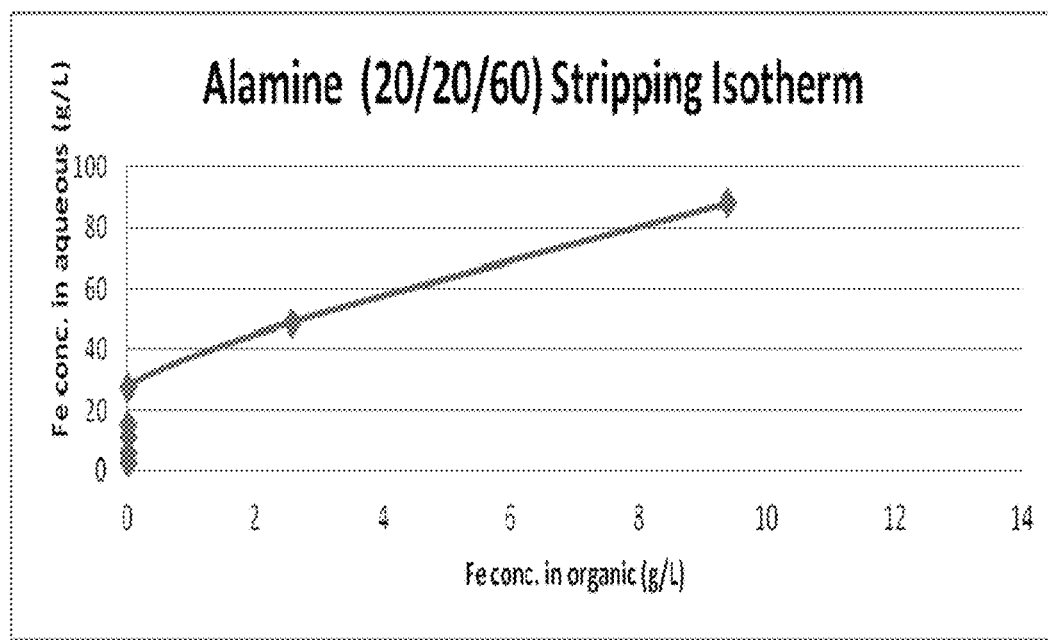
FIG. 2 Alamine (20/20/60) Stripping Isotherm

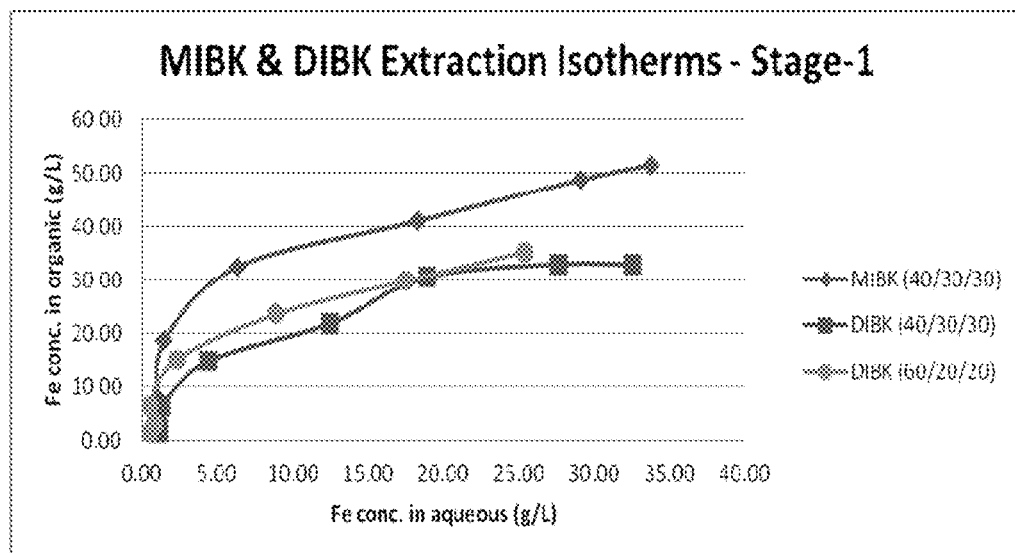
FIG. 3 MIBK & DIBK Extraction and Stripping Isotherms – Stage 1 Data for a Canadian ore body (Composition of raffinate – 4.5 – 6.3 g/L Fe, 1-2 g/L Fe+2, 16-17 g/L Ti)

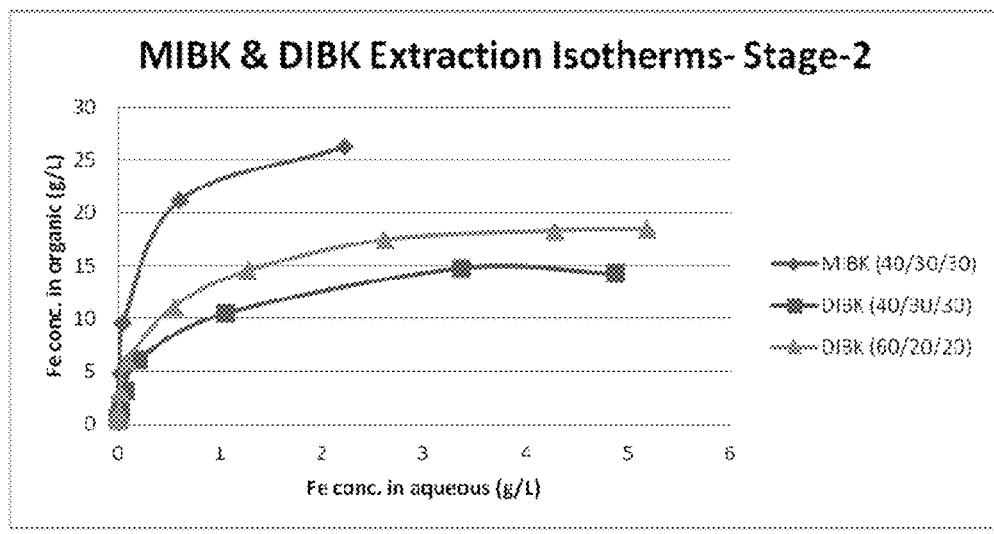
FIG. 4 MIBK & DIBK Extraction and Stripping Isotherms – Stage 2 (Composition of raffinate – 20-30 ppm Fe, 16-17 g/L Ti)

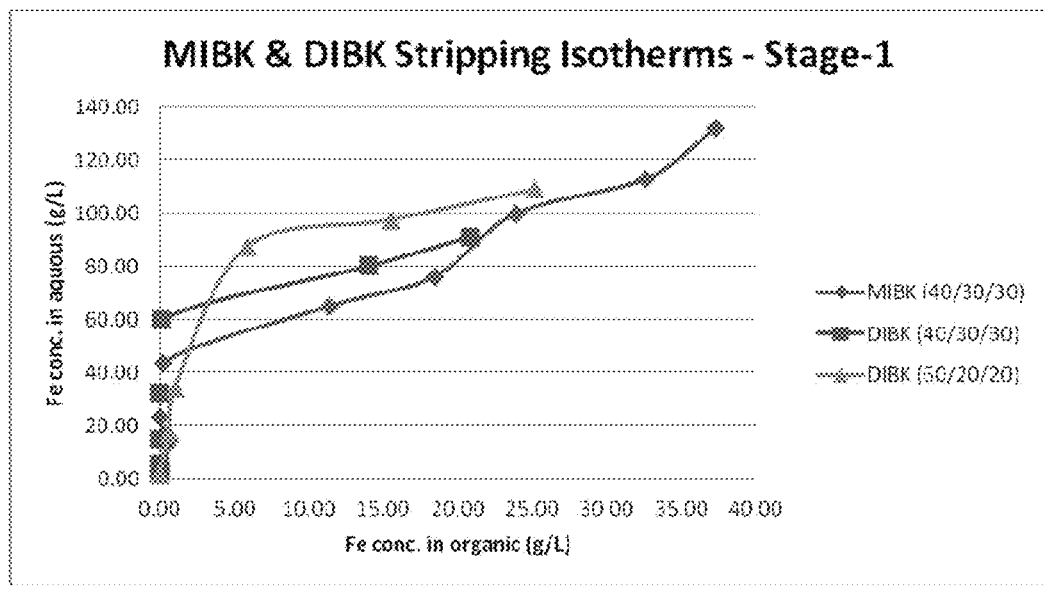
FIG. 5 MIBK & DIBK Stripping Isotherms – Stage 1 on Canadian ore body

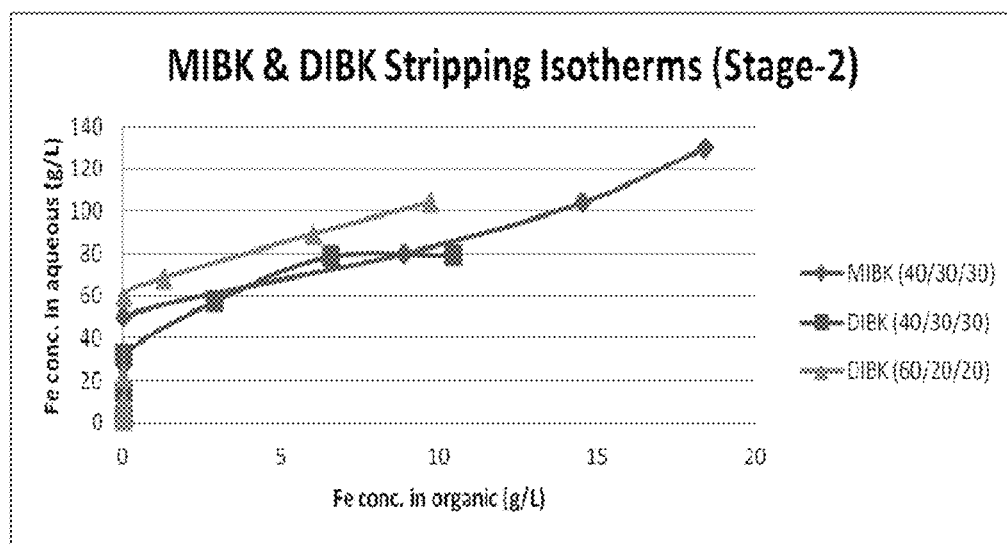
FIG. 6 MIBK & DIBK Extraction and Stripping Isotherms – Stage 2 on Canadian ore body (Composition of raffinate – 20-30 ppm Fe, 16-17 g/L Ti)

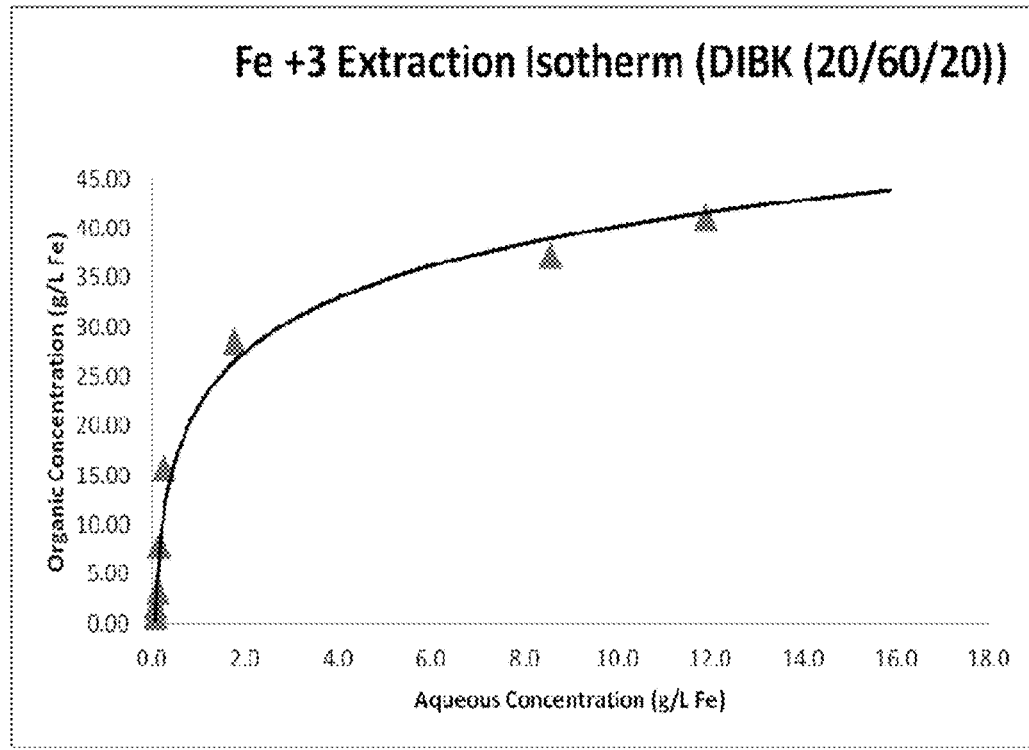
FIG. 7 Fe +3 Extraction Isotherm for an Ilmenite Ore Body (DIBK (20/60/20))
(Composition of raffinate – 30-50 ppm Fe, 11-12 g/L Ti)

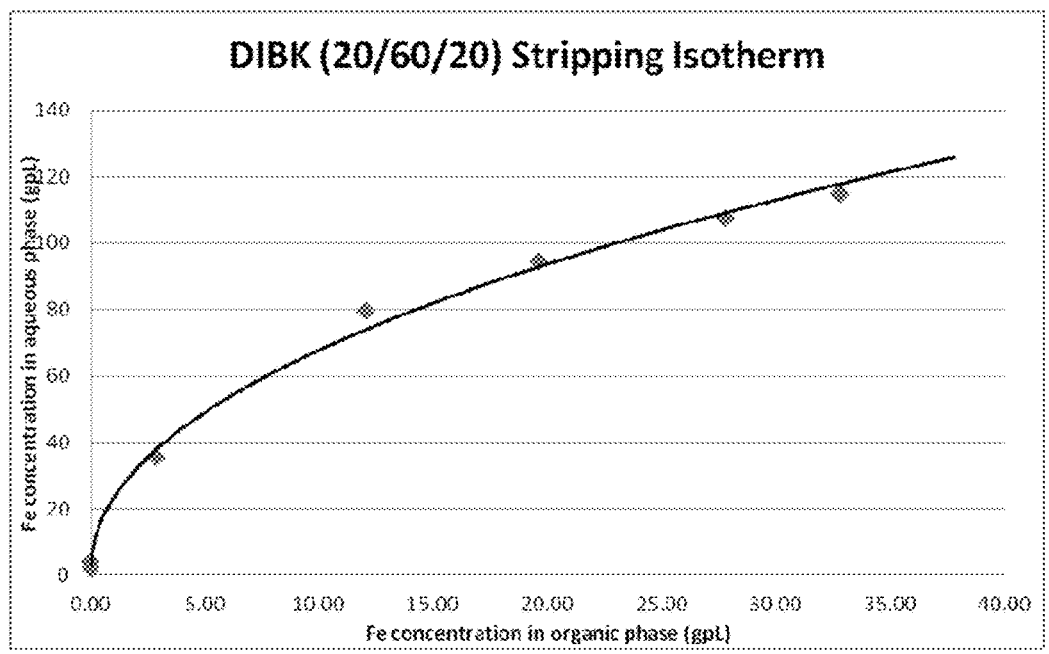
FIG. 8 DIBK (20/60/20) Stripping Isotherm

PROCESS FOR THE SEPARATION OF IRON IN EXTRACTION OF TITANIUM IN MIXED CHLORIDE MEDIA

PRIORITY CLAIM/CROSS REFERENCE TO RELATED APPLICATIONS

Applicant states that this non-provisional utility patent application claims priority from International Patent Application PCT/CA2013/000996 filed on Nov. 29, 2013, which claimed priority from provisional U.S. Patent Application Ser. No. 61/733,033 filed on Dec. 4, 2012, all of which applications are incorporated by reference herein in their entireties.

FIELD OF INVENTION

The present invention relates to a method for the leaching and recovery of value metals from titanium-bearing (titaniferous) ores, especially titanium in the form of titanium metal or titanium dioxide, including ores or concentrates e.g. ilmenite ores or concentrates. One embodiment disclosed describes a process for leaching of titaniferous ores with a lixiviant of hydrochloric acid and magnesium chloride under conditions such that both iron and titanium in the ore are leached into solution.

STATEMENT REGARDING FEDERALLY SPONSORED RESEARCH OR DEVELOPMENT

No federal funds were used to develop or create the disclosed invention.

REFERENCE TO SEQUENCE LISTING, A TABLE, OR A COMPUTER PROGRAM LISTING COMPACT DISK APPENDIX

Not Applicable

AUTHORIZATION PURSUANT TO 37 C.F.R. § 1.171 (d)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

The present invention relates to a method for the leaching and recovery of value metals from titanium-bearing (titaniferous) ores, especially titanium in the form of titanium metal or titanium dioxide, including ores or concentrates e.g. ilmenite ores or concentrates. In particular, the present invention relates to a process for the leaching of titaniferous ores with a lixiviant of hydrochloric acid and magnesium chloride under conditions such that both iron and titanium in the ore are leached into solution. Temperature is controlled so that titanium values remain in solution. Iron is then selectively extracted from the solution in the form of ferric chloride, using a solution of an alkyl ketone to provide a solution of titanium values. Use of the extractant permits recovery and recycling of hydrochloric acid to the leaching step by pyrohydrolysis without the need to need to use evaporation or other concentrating techniques of aqueous hydrochloric acid solution. Iron may be recovered from the pregnant extractant solution. The process operates at atmospheric pressure. Oxidant may be added to oxidize ferrous ions to ferric ions in the leachate from the process. The process operates with a relatively low concentration of hydrochloric acid, especially with the concentration of hydrochloric acid being less than 20% (mass ratio). Hydrochloric acid and magnesium chloride are regenerated and recycled in the process. The process is believed to be friendly to the environment.

DESCRIPTION OF THE PRIOR ART

Processes for the recovery of titanium dioxide from ores e.g. ilmenite, are known. Ilmenite is a titaniferous ore of the general formula $TiO_2.FeO$ with varying amounts of $Fe_2O_3$ and gangue materials, usually silicates, alumina, lime and magnesia. In addition to titanium, ilmenite typically contains other value metals e.g. one or more of vanadium, chromium, copper, manganese, molybdenum, lead, nickel, zinc, zirconium, niobium and tantalum. The majority of recovery processes involve digestion of the ore or a concentrate thereof in a mineral acid, such as hydrochloric acid or sulphuric acid, to remove at least the titanium values from the ore. In many such processes, the purity of the titanium dioxide obtained may be about 90-95%, and hence further purification procedures are required to produce a high quality pigment grade product. The further purification procedures add considerably to the cost, and many of the procedures involve techniques that are environmentally unacceptable without extensive procedures to treat various by-products obtained.

Processes for the recovery of titanium dioxide from ilmenite in high purity and yield are known. In particular, processes for the recovery of titanium from titaniferous ores using a lixiviant of hydrochloric acid and magnesium chloride are described in U.S. Pat. No. 7,803,336 of V. I. Lakshmanan et al, issued 28 Sep. 2010, and incorporated by reference herein. Other known processes are discussed therein. See also U.S. Pat. No. 8,916,116 of Ramamritham Sridhar entitled "Separation of Iron from Value Metals in Leaching of Laterite Ores" which is incorporated by reference herein.

In the extraction of titaniferous ores e.g. ilmenite, iron is typically leached into solution with titanium values. A major end use for the titanium values is as titanium dioxide, and the iron is a contaminant in such a product. Processes for the treatment of solutions of titanium values for removal of iron are known. For example, U.S. Pat. No. 3,922,164 of Reid et al describes removal of iron from ilmenite in an ilmenite up-grading process. Ilmenite is leached with a hydrochloric acid solution containing at least 10% by weight of hydrochloric acid and at least 5% by weight of a soluble salt, suitable salts including ferrous chloride, manganese chloride, magnesium chloride, nickel chloride, calcium chloride and ammonium chloride The introduction of the additional chloride changes the boiling characteristics of the leach liquor so that higher temperatures can be employed, temperatures between 100° C. and 112° C. being preferred but temperatures of up to 115° C. being possible in some systems.

U.S. Pat. No. 6,375,923 of Duyvesteyn et al and "The Altair $TiO_2$ Pigment Process and its Extension into the Field of Nanomaterials" by D. Verhulst, B. Sabacky, T. Spitler and W. Duyvesteyn, pages 417-432, Chloride Metallurgy 2002 Volume II $32^{nd}$ Annual Hydrometallurgy Meeting, Edited by E. Peek and G. Van Weert, published by CIM, describe a hydrometallurgical process for producing pigment-grade titanium dioxide from a titaniferous ore. The process comprises leaching the ore with a solution of hydrochloric acid or recycled hydrochloric acid/iron chloride solution at a temperature of at least 50° C. to provide a leachate of titanium chloride, ferrous chloride, ferric chloride and impurity chlorides, a residue of undissolved solids and sufficient excess hydrochloric acid to prevent precipitation of titanium dioxide. The lixiviant used has a high chloride content, especially >400 g/L. After liquid/solids separation, the ferric ions in the leachate are reduced to ferrous ions. The solution is then cooled to crystallize ferrous chloride. The resultant solution containing titanium ions, ferric ions and ferrous ions is contacted with a water-immiscible organophosphorus extractant. The pregnant strip solution containing titanium and ferric ions, and a minor amount of ferrous ions, is contacted with an amine extractant. The raffinate obtained, which contains titanium ions, is hydrolyzed to produce titanium dioxide. HCl solutions from pyrohydrolysis and from $TiO_2$ hydrolysis are combined and converted into HCl gas and water by pressure-swing distillation.

U.S. Pat. Nos. 6,500,396 and 6,699,446 of V. I. Lakshmanan et al., both incorporated herein by reference, describe methods for the production of titanium metal and titanium tetrachloride from titaniferous ore, titanium dioxide being produced from the titanium tetrachloride. In embodiments, ore or concentrate is leached with an aqueous solution of a hydrogen halide, especially hydrochloric acid, at a temperature of at least 90° C., followed by a solids/liquids separation and extraction with an immiscible organic phase. In other embodiments, the ore is leached with the hydrogen halide in the presence of an oxidizing agent. A variety of oxidizing agents are disclosed, including air, hydrogen or other peroxides, or sodium or other perchlorates. In the leach solution, iron is solublized and titanium is converted into titanium dioxide. Use of concentrated hydrochloric acid (11 N) is illustrated.

U.S. Pat. No. 3,104,950 of D. A. Ellis describes leaching of titaniferous ore using concentrated hydrochloric acid, and separation of iron and titanium values using solvent extraction using trialkyl phosphates and alkyl amines. The effective concentration of hydrochloric acid is stated to be between about 6 and about 12 molar. The temperature may be from about 50° C. to about 80° C.

U.S. Pat. No. 3,622,269 of T. Yamamura et al, issued 23 Nov. 1971, describes recovery of a pure aqueous solution of ferric chloride and an aqueous solution of metal chlorides free of ferric chloride from a solution of metal chlorides. The solution is extracted with a ketone and the pregnant solution of iron values obtained may be treated with aqueous solution to recover iron values. The solution of metal values may be obtained by digestion of ilmenite with hydrochloric acid.

Alternative methods that provide cost-efficient extraction of titanium from titaniferous ores or concentrates and purification of titanium are required.

SUMMARY OF THE INVENTION

It is an object of an aspect of this invention to provide a process for leaching titanium and other value metals from titaniferous ore material, especially ore or concentrate. It is an object of a further aspect of the present invention to provide such a process that operates at atmospheric pressure, and in which in the leaching step titanium is leached into solution. In particular, in the leaching step titanium and iron values are leached into solution. An aspect of the invention provides for separation of iron in the form of ferric iron from leachate to facilitate pyrohydrolysis, for recycle and regeneration, without further concentration.

Accordingly, the present invention provides a process for leaching of titanium from a titaniferous ore material selected from the group consisting of a titanium-bearing ore, concentrate thereof, modified ore thereof and tailings thereof, and mixtures thereof, said process comprising the steps of:
(a) leaching the titanium-bearing ore material at atmospheric pressure with a lixiviant comprising hydrochloric acid and magnesium chloride, said leach being carried out under conditions such that titanium and iron values leached from the titaniferous ore material remain in solution and iron values are converted to ferric iron;
(b) subjecting the leach solution so obtained to liquid/solids separation to obtain a leachate and solids; and
(c) subjecting the leachate to solvent extraction with a dialkyl ketone, to obtain a solution rich in iron and a raffinate, said raffinate containing titanium values.

In preferred embodiments, in the process of step (a), the temperature is less than 85° C., especially less than 80° C. and preferably in the range of 65-80° C.

In another embodiment, in step (a), the hydrochloric acid is at a concentration of less than 20% (mass ratio).

In further embodiments, the titanium-bearing ore material is ilmenite. Preferably, the redox potential (Eh) of the leach solution is at least 350 mV. In addition, the concentration of magnesium chloride is at least 100 g/L and in particular, the total concentration of chloride ions is in the range of 100-400 g/L, said total concentration being formed from magnesium chloride and hydrochloric acid. In particular, the amount of hydrochloric acid is in the range of 30-200 g/L.

In embodiments, the lixiviant comprises hydrochloric acid at a concentration of less than 20% (mass ratio), magnesium chloride and an oxidant selected from the group consisting of alkali metal peroxide, alkali metal perchlorate, ammonium perchlorate, magnesium perchlorate, magnesium chlorate, alkali metal chlorate, chlorine, alkali metal hypochlorite, hydrogen peroxide, perchloric acid and other non-sulphur containing oxidants, and mixtures thereof.

Preferably, raffinate from step (c) is subjected to steps to recover value metals therefrom, especially the raffinate is subjected to steps to recover titanium values. In particular, the solution rich in iron from step (c) is subjected to steps to recover iron.

In further embodiments, a raffinate of hydrochloric acid and magnesium chloride is obtained, said raffinate being subjected to steps to recover hydrochloric acid by pyrohydrolysis or a hydrothermal process and to steps to recover magnesium chloride.

In particular embodiments, the dialkyl ketone has alkyl groups selected from the group consisting of $C_1$-$C_6$ alkyl groups. In particular, the alkyl groups are selected from the group consisting of methyl, ethyl, propyl, isopropyl and isobutyl, especially methylisobutyl ketone or dibutyl ketone.

In another embodiment, the present invention provides a process for leaching of titanium from a titaniferous ore material selected from the group consisting of a titanium-bearing ore, concentrate thereof, modified ore thereof and tailings thereof, and mixtures thereof, said process comprising the steps of:
(a) leaching the titanium-bearing ore material at atmospheric pressure with a lixiviant comprising hydrochloric acid and magnesium chloride, said leach being carried out under conditions such that titanium and iron values leached from the titaniferous ore material remain in solution;
(b) subjecting the leach solution so obtained to liquid/solids separation to obtain a leachate and solids; and
(c) subjecting the leachate to solvent extraction with a dialkyl ketone, to obtain a solution rich in iron and a raffinate, said raffinate containing titanium values.

In a preferred embodiment, the temperature in step (a) is less than 85° C. in step (a) and in step (c) iron values in the leachate are converted to ferric iron prior to solvent extraction.

In another preferred embodiment, in step (c) the iron values are converted to ferric iron using an oxidant selected from the group consisting of alkali metal peroxide, alkali metal perchlorate, ammonium perchlorate, magnesium perchlorate, magnesium chlorate, alkali metal chlorate, chlorine, alkali metal hypochlorite, hydrogen peroxide, perchloric acid and other non-sulphur containing oxidants, and mixtures thereof.

In other preferred embodiment, the dialkyl ketone has alkyl groups selected from the group consisting of $C_1$-$C_6$ alkyl groups, especially alkyl groups are selected from the group consisting of methyl, ethyl, propyl, isopropyl and isobutyl. In particular, the alkyl groups are methylisobutyl ketone or dibutyl ketone.

In other embodiments, step (a) is controlled so that iron in solution is in the form of ferric iron. In particular, the concentration of acid is maintained sufficiently high so that ferric iron is formed in preference to ferrous iron.

DETAILED DESCRIPTION-BRIEF DESCRIPTION OF THE FIGURES

The present invention will be described with reference to the embodiments of the invention shown in the examples, in which extraction isotherms for various comparative runs (A) and runs illustrating the invention are shown (B & C).

FIG. 1 presents the Alamine (20/20/60) Extraction Isotherm wherein the composition of the raffinate is -<1 ppm Fe and 12- 13 g/L Ti which represents the prior art.

FIG. 2 presents the Alamine (20/20/60) Stripping Isotherm which represents the prior art.

FIG. 3 presents MIBK & DIBK Extraction and Stripping Isotherms—Stage 1 data for a Canadian ore body wherein the composition of the raffinate is 4.5-6.3 g/L Fe, 1-2 g/L Fe+2, 16-17 g/L Ti which the represents the invention disclosed.

FIG. 4 presents MIBK & DIBK Extraction and Stripping Isotherms—Stage 2 wherein the composition of the raffinate is 20-30 ppm Fe, 16-17 g/L Ti which represents the invention disclosed.

FIG. 5 presents MIBK & DIBK Stripping Isotherms—Stage on Canadian ore body which represents the invention disclosed.

FIG. 6 presents MIBK & DIBK Extraction and Stripping Isotherms—Stage 2 on Canadian ore body wherein the composition of raffinate is 20-30 ppm Fe, 16-17 g/L Ti which represents the invention disclosed.

FIG. 7 presents Fe +3 Extraction Isotherm for an Ilmenite Ore Body wherein DIBK (20/60/20)) and the composition of the raffinate is 30-50 ppm Fe, 11-12 g/L Ti representing the results of the invention disclosed.

FIG. 8 presents the DIBK (20/60/20) Stripping Isotherm representing the invention disclosed.

DETAILED DESCRIPTION-BRIEF DESCRIPTION OF THE TABLES

Table 1 presents Run A-1 Fe extraction data without oxidation of pregnant liquor (PL) having a feed composition of 69-70 g/L Fe and 13-14 g/L Ti which represents the prior art.

TABLE 1

RUN A
(Without oxidation of leachate)
Alamine ™ - Extraction and Stripping Isotherms
Data for a Canadian ore body

| Composition | Time (min) | Temp. (C.) | O/A Ratio | Stages | Max. Fe Extraction (g/L) |
|---|---|---|---|---|---|
| Alamine (20/20/60) | 5 | 40 | 5:01 | 3 | 13.9 |

Run A-1, Fe Extraction data without Oxidation of PL (Feed Composition - 69-70 g/L Fe, 13-14 g/L Ti)

Table 2 presents Run A-2 Fe stripping data without Oxidation of PL on Canadian ore body.

TABLE 2

RUN A
(Without oxidation of leachate)
Alamine ™ - 336 Extraction and Stripping Isotherms
Data for a Canadian ore body

| Composition | Time (min) | Temp. (C.) | O/A Ratio | Stages | Max. Fe in preg. Strip (g/L) |
|---|---|---|---|---|---|
| Alamine (20/20/60) | 5 | 40 | 5:01 | 4 | 69.5 |

Run A-2, Fe stripping data without Oxidation of PL (Canadian ore body)

Table 3 presents Run B-1 Stage-1, Fe extraction data with oxidation of PL wherein feed composition is 33-38 g/L Fe, 1-2 g/L Fe+2, 16-17 g/L Ti which represents the invention disclosed.

TABLE 3

RUN B
(With oxidation of leachate)
MIBK & DIBK Extraction and Stripping Isotherms
Data for a Canadian ore body

| Composition | Time (min) | Temp. (C.) | O/A Ratio | Stages | Max. Fe Extraction (g/L) |
|---|---|---|---|---|---|
| MIBK (40/30/30) | 5 | R.T. | 0.85:1 | 3 | 45.7 |
| DIBK (40/30/30) | 5 | R.T. | 1.25:1 | 3 | 27.4 |
| DIBK (60/20/20) | 5 | R.T. | 0.85:1 | 3 | 37.3 |

Run B-1 Stage-1, Fe Extraction data with oxidation of PL (Feed: 33-38 g/L Fe + 2, 16-17 g/L Ti)

Table 4 presents Run B-2 Stage-2, Fe Extraction data with oxidation of PL wherein feed composition is—4.5-6.3 g/L Fe, 20-30 ppm Fe+2, 16-17 g/L Ti which the represents the invention disclosed.

TABLE 4

RUN B
(With oxidation of leachate)
MIBK & DIBK Extraction and Stripping Isotherms Data
for a Canadian ore body

| Composition | Time (min) | Temp. (C.) | O/A Ratio | Stages | Max. Fe Extraction (g/L) |
|---|---|---|---|---|---|
| MIBK (40/30/30) | 5 | R.T. | 1:05 | 3 | 24.25 |
| DIBK (40/30/30) | 5 | R.T. | 1:2.25 | 3 | 14.17 |
| DIBK (60/20/20) | 5 | R.T. | 1:3 | 3 | 18.3 |

Run B-2 Stage-2, Fe Extraction data with oxidation of PL (Feed - 4.5-6.3 g/L Fe, 20-30 ppm Fe + 2, 16-17 g/L Ti)

Table 5 presents Run B-3, Stage-1 Fe stripping data with oxidation of PL for Canadian ore body which represents the invention disclosed.

TABLE 5

RUN B
(With oxidation of leachate)
MIBK & DIBK Extraction and Stripping Isotherms
Data for a Canadian ore body

| Composition | Time (min) | Temp. (C.) | O/A Ratio | Stages | Max. Fe in preg. strip (g/L) |
|---|---|---|---|---|---|
| MIBK (40/30/30) | 5 | R.T. | 3:01 | 6 | 131.7 |
| DIBK (40/30/30) | 5 | R.T. | 3.3:1 | 3 | 99 |
| DIBK (60/20/20) | 5 | R.T. | 2.85:1 | 4 | 100 |

Run B-3, Stage-1: Fe stripping data with oxidation of PL (Canadian ore body)

Table 6 presents Run B-4, Stage-2: Fe stripping data with oxidation of PL on Canadian ore body which represents the invention disclosed.

TABLE 6

RUN B
(With oxidation of leachate)
MIBK & DIBK Extraction and Stripping Isotherms
Data for a Canadian ore body

| Composition | Time (min) | Temp. (C.) | O/A Ratio | Stages | Max. Fe in preg. strip (g/L) |
|---|---|---|---|---|---|
| MIBK (40/30/30) | 5 | R.T. | 4.8:1 | 4 | 119.5 |
| DIBK (40/30/30) | 5 | R.T. | 5.25:1 | 3 | 75.6 |
| DIBK (60/20/20) | 5 | R.T. | 4.25:1 | 4 | 80.1 |

Run B-4, Stage-2: Fe stripping data with oxidation of PL (Canadian ore body)

Table 7 presents Run C-1 Fe Extraction data with oxidation of PL wherein feed composition is 16-17 g/L Fe, 0.1 g/L Fe+2, 11-12 g/L Ti which represents the invention disclosed.

TABLE 7

RUN C
DIBK Extraction and Stripping Isotherms Data for an ilmenite ore body

| Composition | Time (min) | Temp. (C.) | O/A Ratio | Stages | Max. Fe Extraction (g/L) |
|---|---|---|---|---|---|
| DIBK (20/60/20) | 5 | R.T. | 1:2.5 | 3 | 40 |

Run C-1, Fe Extraction data with oxidation of PL (Feed - 16-17 g/L Fe, 0.1 g/L Fe + 2, 11-12 g/L Ti)

Table 8 presents Run C-2 Fe stripping data with oxidation of PL on ilmenite ore body representing the invention disclosed.

TABLE 8

RUN C
DIBK Extraction and Stripping Isotherms Data for an ilmenite ore body

| Composition | Time (min) | Temp. (C.) | O/A Ratio | Stages | Max. Fe in preg. strip (g/L) |
|---|---|---|---|---|---|
| DIBK (20/60/20) | 5 | R.T. | 2.8:01 | 4 | 117.6 |

Run C-2, Fe stripping data with oxidation of PL (ilmenite ore body)

DETAILED DESCRIPTION—DESCRIPTION OF ILLUSTRATIVE PROCESSES

The present invention relates to a process for leaching of a value metal from a titanium-bearing ore material. In particularly preferred embodiments, the present invention is directed to the recovery of titanium in the form of titanium metal or titanium dioxide from titanium-bearing ores, especially ilmenite, in which steps are taken to remove iron as ferric iron by solvent extraction from leachate solution from the process, titanium values remaining in the leachate.

In its most preferred and comprehensive embodiments, the present invention relates to leaching of ilmenite with a lixiviant of hydrochloric acid and magnesium chloride under conditions such that both titanium and iron values are leached into solution. Using sequential extraction procedures, especially solvent extraction procedures, iron values in the form of ferric iron are separated from the leach solution and in particular separated from titanium values in the leach solution. Titanium values remain in the leach solution with iron values being extracted therefrom in the form of ferric iron. The thus purified leach solution is treated for recovery of titanium dioxide or other form of titanium. Lixiviant solution is regenerated, and hydrochloric acid, magnesium chloride and magnesium oxide used in the process are recovered and recycled. The steps taken for separation of iron result in a solution of hydrochloric acid, and especially of hydrochloric acid and magnesium chloride, that may be subjected to regeneration of hydrochloric acid by pyrohydrolysis without further concentration of the solutions.

A process of the prior art describes a process for iron extraction from pregnant leach liquor obtained by leaching of ilmenite ore in mixed chloride lixiviant i.e. using hydrochloric and magnesium chloride. This process involved the use of ALAMINE™ 336 water-soluble trioctyl/decyl amine tributyl phosphate (TBP) for extraction of iron. For instance, the concentration of iron in pregnant strip solution used with these organic extractants was ~35 gpL iron. The iron pregnant strip solution was fed to pyrohydrolysis unit for regeneration of HCl and production of high purity iron oxide. It was found that the iron pregnant strip solution needed to be subjected to evaporation to a concentration of ~120 gpL iron before it could be fed to pyrohydrolysis unit. Evaporation of pregnant strip solution is an energy intensive process and adds substantial cost to the process.

The present invention is directed to the use of a new organic extractant (a ketone) for extraction of iron from pregnant leach liquor obtained by leaching of ilmenite ore in mixed chloride lixiviant. The use of this reagent has two major advantages; 1) It produces an iron pregnant strip liquor with ~120 gpL iron concentration, which can be fed directly to a pyrohydrolysis process without need of evaporation, resulting in substantial cost savings and 2) It produces an iron pregnant strip liquor that has much higher purity compared to the pregnant strip liquor generated by the use of ALAMINE™ 336 and tributyl phosphate (TBP). It has also been found that use of the ketone is highly selective for iron and does not co-extract other elements such as Ti. This results in a very high purity iron pregnant strip. In particular, the process involves oxidation of ferrous iron to ferric iron in the pregnant leach liquor with HCl and $MgCl_2$, as the dialkyl ketone extracting reagent is a highly selective extractant for ferric iron.

The titanium-bearing ore material may be ore per se, but is preferably a concentrate thereof. Techniques for treating ilmenite ore, to form a concentrate or for beneficiation of the ore are known, including the use of gravity or magnetic separation steps. The process is preferably operated with a concentrate of the ore. In other embodiments, the ore may have been subjected to a smelting step in the presence of carbon and/or fluxing agents, after which a slag is separated from the smelting process and subjected to the leaching step. Thus, the ore could be in the form of a slag. The ore could also be in the form of titanium-containing concentrates or other intermediates, all of which including the slag discussed above being referred to herein as modified ores. The ore may also be in the form of tailings of a titanium-bearing ore. It is understood that the expression "ore" also includes any other form of the ore, and that mixtures of the various forms of the ore may be used. The process of the present invention may be operated without pre-treatment of the titanium-bearing ore. In particular, the process may be operated with or without roasting or reduction of the ore.

In the method of the present invention, ore in a form as discussed above is fed to a leaching step in which the ore is contacted and leached with a lixiviant comprising magnesium chloride and hydrochloric acid, optionally also containing an oxidant. It is particularly preferred that cations fed to the process be restricted to magnesium i.e. in the form of magnesium chloride or magnesium oxide.

The optional oxidant is selected from the group consisting of alkali metal peroxide, alkali metal perchlorate, ammonium perchlorate, magnesium perchlorate, alkali metal chlorate, magnesium chlorate, alkali metal hypochlorite, chlorine, hydrogen peroxide, oxygen, air and other non-sulphur containing oxidants, and mixtures thereof. Examples of alkali metal peroxide are sodium peroxide and potassium peroxide. Examples of alkali metal perchlorates are sodium perchlorate and potassium perchlorate. Ammonium perchlorate, magnesium perchlorate and magnesium chlorate may also be used. Examples of alkali metal chlorates are sodium chlorate and potassium chlorate. An example of an alkali metal hypochlorite is sodium hypochlorite. Other oxidants are non-sulphur containing oxidants; the presence of sulphur in oxidants is to be avoided. The preferred oxidants are chlorine and sodium chlorate.

The leaching step may be conducted continuously as a co-current step, a countercurrent step or in another manner, or the leaching step may be conducted as a batch step. The leaching step is carried out at atmospheric (ambient) pressure i.e. it is not necessary to conduct the leaching step under pressure. The leach is carried out under conditions such that titanium leached from the titanium-bearing ore material is leached into solution and remains in solution i.e. the titanium does not precipitate as, for example titanium dioxide. If the titanium bearing ore material is ilmenite, both titanium and iron are leached into solution. In particular, the leach is carried out at a temperature of less than 85° C., especially at a temperature of less than 80° C. and most preferably at a temperature in the range of 65-80° C. In preferred embodiments, the leaching step is carried out with a chloride concentration of at least 50 g/L and with hydrochloric acid having a maximum concentration of 20% (mass ratio). The upper limit on the chloride concentration may depend on the ions present in the leach solution, especially as a result of leaching of the ore, and resultant formation of complexes. The chloride concentration is most preferably in the range of 100-500 g/L, and especially 150-400 g/L.

In particularly preferred embodiments of the invention, the chloride is derived from magnesium chloride and hydrochloric acid, and the chloride concentration of 100-400 g/L is calculated on the basis of the amounts of magnesium chloride and hydrochloric acid in the lixiviant solution. In particularly preferred embodiments, the amount of hydrochloric acid is in the range of 30-200 g/L and the amount of magnesium chloride is in the range of 80-350 g/L.

The metal chloride/HCl (metal to hydrochloric acid) ratio expressed in terms of mass percentage (m/m) in the leach is preferably adjusted to optimize the leach, based on for example the particular ore being leached and temperature.

The amount of oxidant, if present, relates to the redox potential (Eh) of the leaching solution. The Eh (redox potential versus SHE (standard hydrogen electrode)) is preferably maintained in the range of 150-700 mV, and in preferred embodiments is at least 350 mV. It is believed that increases in Eh tend to increase the amount of titanium that is leached.

As noted above, the leach is carried out at temperatures under titanium remains in solution during the leach. In particular, the leach may be carried out at a temperature of up to about 85° C., especially at less than about 80° C. and preferably at temperatures in the range of about 65-80° C. Under some leaching conditions, precipitation of titanium dioxide may occur at temperatures approaching 85° C. in which event the temperature of the leach should be lowered.

A value metal-rich solution (leachate) is obtained in the leach step. The residue (solids) may be in the form of a suspension. The leach mixture is fed to a solid/liquid separation step to effect separation of leachate from solids e.g. leach residue and other gangue. Techniques for such separation are known e.g. using a pressure or vacuum filter, counter-current decantation or centrifuge.

In the process of the present invention, and the aspect to which this application is particularly directed, the leachate obtained from the above solids/liquid separation steps is subjected to a step to separate value metals, and in particular to separate iron values in the leachate from titanium, and other value metals. The preferred method of recovery of iron, and separation from titanium, from the leachate uses solvent extraction. For separation of iron, the leachate is subjected to solvent extraction with a dialkyl ketone. In particular, the alkyl groups of the dialkyl ketone may be $C_1$-$C_6$ alkyl groups, especially $C_1$-$C_4$ alkyl groups, examples of which are methyl, ethyl, propyl and butyl including isopropyl and isobutyl. Preferred ketones are methylisobutylketone (MIBK) and diisobutylketone (DIBK). The dialkyl ketone is preferably mixed with a diluent and a modifier. Examples of the diluent are organic phase diluents, for instance kerosenes e.g. CF-231 kerosene. Examples of the modifier are alcohol surfactants e.g. EXXAL™ 13 tridecylalcohol.

In particularly important embodiments of the invention, the iron is in the form of ferric iron. The leaching step of the process may be operated under conditions such that iron in solution is in the form of ferric iron, and the leachate from the process, which is the liquid subjected to solvent extraction, has the iron in the form of ferric iron. Alternatively, or additionally, the conditions of the leachate may be adjusted so that any iron in the form of ferrous iron is converted to ferric iron. The composition of the leachate solution, which is a solution of hydrochloric acid and magnesium chloride in addition to value metals, may be adjusted so that ferrous iron in the solution becomes oxidized to ferric iron. As is illustrated in the examples, oxidation of iron to the ferric state results in substantial increases in the extraction of iron from solution and improvements in the selectivity of extraction of iron over titanium. The result is titanium of higher purity.

After solvent extraction, the pregnant organic solution containing iron is separated from the aqueous liquid (raffinate). It is preferred that the solvent extraction with the dialkyl ketone be carried out in a multi-step process i.e. raffinate from a first solvent extraction is subjected to further solvent extraction with dialkyl ketone, followed by separation of solvent from raffinate. Such steps may be repeated a number of times. The solvent extraction separates iron values, in the form of ferric iron, from the leachate of the leach solution. The remaining liquid (raffinate) contains titanium and other metal values, as well as lixiviant i.e. hydrochloric acid and magnesium chloride, and steps may be taken to recover such metal values. In particular, titanium may be recovered.

Steps for the recovery of titanium from such liquid are known. For example, the aqueous solution containing titanium may be subjected to a precipitation step, by raising the temperature to 85-110° C. or by using for example water or a base, preferably magnesium oxide. If magnesium oxide is used, the magnesium chloride obtained may be recycled to the leach step, or subjected to steps to recover magnesium oxide and hydrochloric acid. Solvent extraction techniques may also be used.

In the recovery and recycle of HCl, the solution containing HCl may be directed to pyrohydrolysis. An azeotrope of hydrochloric acid is obtained. The azeotrope of hydrochloric acid has a content of hydrochloric acid of about 20% (mass ratio). The azeotrope may be recycled to the lixiviant solution, offered for sale or used in another manner.

The leaching process may be conducted continuously in at least one stirred tank reactor. Preferably, at least two reactors are used; three or more reactors may be more optimal. As discussed above, the leaching may also be conducted batch, co-current or countercurrent, in whole or in part.

The process of the present invention does not require pre-treatment of the titanium-bearing ore prior to the leaching step. The leaching conditions, especially the redox potential (Eh) and chloride concentration, may be controlled thereby providing for control of leaching of value metals, formation of chloride complexes and extraction of iron, as will be apparent to persons versed in the chemistry of extraction of titanium-bearing ores.

A particular advantage of the process of the present invention is that high rates of extraction of value metals are obtained in a leaching step that operates at atmospheric pressure and at relatively low concentrations of hydrochloric acid. A particularly important aspect of the invention allows hydrochloric acid raffinate to be fed directly to pyrohydrolysis with pre-evaporation steps. This is a substantial savings in the cost of operation of the process. The separation of iron from titanium may be conducted at ambient temperature. In addition, it is not necessary to operate the leaching step under pressure. The use of atmospheric pressure results in substantial economic advantages, especially in capital costs. Value metals may be recovered. The use of chloride chemistry offers advantages in operating and capital costs of the process. Leaching agent may be regenerated and recycled, especially using a pyrohydrolysis step with additional hydrochloric acid being formed from chlorine if required. Magnesium chloride is the particularly preferred chloride, as it is more readily recycled to the leaching step. The use of hydrochloric acid permits recovery and recycle of hydrochloric acid to the leaching step, especially with relatively small amounts of make-up hydrochloric acid. In particular, the use of the preferred lixiviant of hydrochloric acid and magnesium chloride permits recycle of hydrochloric acid, magnesium chloride and magnesium oxide in the process. The preferred absence of addition of cations other than magnesium to the process facilitates recycle, minimizing potentially detrimental effects of other cations on recycle. In addition, the use of hydrochloric acid in concentrations of not more than 20% (mass ratio) permits use of azeotropic distillation and without addition of substantial amounts of more concentrated hydrochloric acid. The latter would require use of extensive vacuum distillation techniques. The use of the lower concentrations of hydrochloric acid will tend to result in lower extraction of impurities or gangue from the ore, and thus lower concentrations of impurities in solution. Materials requirements for neutralization and other steps are lowered. In particular, the present invention provides for use of azeotropic hydrochloric acid produced by pyrohydrolysis of recycle solutions without the need for addition of hydrochloric acid and disposal of excess hydrochloric acid, which is an environmental problem.

The invention is illustrated by the examples below and as shown in the various figures and charts incorporated herein. In the examples, the runs identified with the notation A are examples of the prior art i.e. comparative runs, and are not of the present invention. (See Tables 1-2 and FIGS. 1-2) The runs identified with the notation B and C are runs illustrating the present invention; Runs B and C are on different ore bodies. (See Tables 3-8 and FIGS. 3-8)

In all of the runs, a sample of titaniferous ore had been leached with a lixiviant of hydrochloric acid and magnesium chloride. After a solids/liquids separation, the leachate obtained was subjected to extraction. In the comparative runs A-1 and A-2, the extractant was ALAMINE™ 336 water-soluble trioctyl/decyl amine, in combination with EXXAL™ 13 tridecyl alcohol and kerosene; thus the ratio of 20/20/60 shown in the examples for ALAMINE™ 336 refers to ALAMINE™ 336/EXXAL™ 13 tridecyl alcohol/kerosene in ratios of 20/20/60. PL refers to pregnant liquor. Time of extraction, temperature, organic/aqueous ratio (O/A), the number of stages in the extraction and the maximum amount of iron extracted are given. Compositions of the feed and raffinate after extraction are given. (See Tables 1-2 and FIGS. 1-2)

The various runs of B are runs of the invention. (See Tables 3-6 and FIGS. 3-6) All runs used pregnant liquor that had been subjected to oxidation, so the all iron was in the form of ferric ions, not ferrous ions. The temperature "R.T." refers to room or ambient temperature i.e. the samples were not heated. MIBK refers to methylisobutyl ketone. DIBK refers to diisobutyl ketone. Compositions of the feed and raffinate after extraction are given. The ratios given refer to ketone: EXXAL™ 13 tridecyl alcohol/kerosene ratios, as above.

Having described the preferred embodiments, other features, benefits and advantages of the Process for the Separation Of Iron In Extraction Of Titanium In Mixed Chloride Media will undoubtedly occur to those versed in the art, as will numerous modifications and alterations in the embodiments as illustrated herein, all of which may be achieved without departing from the spirit and scope of the Process for the Separation Of Iron In Extraction Of Titanium In Mixed Chloride Media disclosed herein.

The invention claimed is:

1. A process for leaching of titanium from a titaniferous ore material selected from the group consisting of a titanium-bearing ore titanium-bearing ore concentrate, modified ore tailings of titanium-bearing ore and mixtures thereof, said process comprising the steps of:
   (a) leaching the titaniferous ore material at atmospheric pressure with a lixiviant comprising hydrochloric acid and magnesium chloride to obtain a leach solution, in which the hydrochloric acid is at a concentration of less than 20% (mass ratio), the hydrochloric acid is in the range of 30-200 g/L, the concentration of magnesium chloride is at least 100 g/L, the total concentration of chloride ions is in the range of 100-400 g/L, said total concentration of chloride ions being formed from magnesium chloride and hydrochloric acid, said leaching being carried out under conditions such that titanium and iron values leached from the titaniferous ore material remain in solution and iron values are converted to ferric iron;
   (b) subjecting the leach solution so obtained to liquid/solids separation to obtain a leachate and solids; and
   (c) subjecting the leachate to solvent extraction with a dialkyl ketone, to obtain a solution rich in iron and a raffinate, said raffinate containing titanium values.

2. The process of claim 1 which is effected at a temperature less than 85° C.

3. The process of claim 2 in which the temperature is less than 80° C.

4. The process of claim 3 in which the temperature is in the range of 65-80° C.

5. The process of claim 1 in which the titanium-bearing ore material is ilmenite.

6. The process of claim 5 in which the redox potential (Eh) of the leach solution is at least 350 mV.

7. The process of claim 2 in which the lixiviant comprises hydrochloric acid at a concentration of less than 20% (mass ratio), magnesium chloride and an oxidant selected from the group consisting of alkali metal peroxide, alkali metal perchlorate, ammonium perchlorate, magnesium perchlorate, magnesium chlorate, alkali metal chlorate, chlorine, alkali metal hypochlorite, hydrogen peroxide, perchloric acid and other non-sulphur containing oxidants, and mixtures thereof.

8. The process of claim 2 in which raffinate from step (c) is subjected to steps to recover value metals therefrom.

9. The process of claim 8 in which the raffinate is subjected to steps to recover titanium values.

10. The process of claim 2 in which the solution rich in iron from step (c) is subjected to steps to recover iron.

11. The process of claim 9 in which a raffinate of hydrochloric acid and magnesium chloride is obtained, said raffinate being subjected to steps to recover hydrochloric acid by pyrohydrolysis or a hydrothermal process and to steps to recover magnesium chloride.

12. The process of claim 1 in which the dialkyl ketone has alkyl groups selected from the group consisting of C1-C6 alkyl groups.

13. The process of claim 12 in which the alkyl groups are selected from the group consisting of methyl, ethyl, propyl, isopropyl and isobutyl.

14. The process of claim 13 in which the dialkyl ketone is methylisobutyl ketone or dibutyl ketone.

15. A process for leaching of titanium from a titaniferous ore material selected from the group consisting of a titanium-bearing ore titanium-bearing ore concentrate, modified ore, tailings of titanium-bearing ore and mixtures thereof, said process comprising the steps of:
   (a) leaching the titaniferous ore material at atmospheric pressure with a lixiviant comprising hydrochloric acid and magnesium chloride to obtain a leach solution, in which the hydrochloric acid is at a concentration of less than 20% (mass ratio), the hydrochloric acid is in the range of 30-200 g/L, the concentration of magnesium chloride is at least 100 g/L, the total concentration of chloride ions is in the range of 100-400 g/L, said total concentration of chloride ions being formed from magnesium chloride and hydrochloric acid, said leaching being carried out under conditions such that titanium and iron values leached from the titaniferous ore material remain in solution;
   (b) subjecting the leach solution so obtained to liquid/solids separation to obtain a leachate and solids; and
   (c) subjecting the leachate to solvent extraction with a dialkyl ketone, to obtain a solution rich in iron and a raffinate, said raffinate containing titanium values.

16. The process of claim 15 in which the temperature in step (a) is less than 85° C. in step (a) and in step (c) iron values in the leachate are converted to ferric iron prior to solvent extraction.

17. The process of claim 16 in which in step (c) the iron values are converted to ferric iron using an oxidant selected from the group consisting of alkali metal peroxide, alkali metal perchlorate, ammonium perchlorate, magnesium perchlorate, magnesium chlorate, alkali metal chlorate, chlorine, alkali metal hypochlorite, hydrogen peroxide, perchloric acid and other non-sulphur containing oxidants, and mixtures thereof.

18. The process of claim 17 in which the dialkyl ketone has alkyl groups selected from the group consisting of C1-C6 alkyl groups.

19. The process of claim 18 in which the alkyl groups are selected from the group consisting of methyl, ethyl, propyl, isopropyl and isobutyl.

20. The process of claim 18 in which the dialkyl ketone is methylisobutyl ketone or dibutyl ketone.

21. The process of claim 16 in which step (a) is controlled so that iron in solution is in the form of ferric iron.

22. The process of claim 21 in which the concentration of acid is maintained sufficiently high so that ferric iron is formed in preference to ferrous iron.

* * * * *